US007936558B2

(12) United States Patent
Chang

(10) Patent No.: US 7,936,558 B2
(45) Date of Patent: May 3, 2011

(54) ELECTRONIC DEVICE

(75) Inventor: Hung-Chi Chang, Taipei Hsien (TW)

(73) Assignee: Wistron Corporation, Taipei (JP)

( * ) Notice: Subject to any disclaimer, the term of this patent is extended or adjusted under 35 U.S.C. 154(b) by 147 days.

(21) Appl. No.: 12/470,286

(22) Filed: May 21, 2009

(65) Prior Publication Data

US 2010/0124006 A1    May 20, 2010

(30) Foreign Application Priority Data

Nov. 18, 2008 (TW) ................................ 97220637 U

(51) Int. Cl.
*H05K 7/14* (2006.01)
(52) U.S. Cl. ......... 361/679.04; 361/679.21; 361/679.26; 361/679.56; 248/917; 455/575.4
(58) Field of Classification Search ............. 361/679.04, 361/679.21, 679.22, 679.56; 248/917–924; 455/575.1–575.4
See application file for complete search history.

(56) References Cited

U.S. PATENT DOCUMENTS

| 6,343,006 B1 | 1/2002 | Moscovitch et al. |
| 6,532,146 B1 * | 3/2003 | Duquette ................. 361/679.04 |
| 6,931,265 B2 * | 8/2005 | Reyes et al. .................... 455/566 |

* cited by examiner

*Primary Examiner* — Jayprakash N Gandhi
*Assistant Examiner* — Ingrid Wright
(74) *Attorney, Agent, or Firm* — Pillsbury Winthrop Shaw Pittman LLP

(57) ABSTRACT

An electronic device includes first and second screens, and a slide mechanism. The first screen includes a housing and a first display panel. The second screen is disposed behind the housing, and includes a second display panel. The slide mechanism includes two slide rails connected to the housing, and a slide frame connected slidably to the slide rails and coupled to the second display panel. One of the slide rails has first and second positioning recesses. The slide frame can bring the second display panel to move between an initial position where the second display panel is located on a rear face of the housing and a retaining unit is retained in the first positioning recess, and an open position where the second display panel is exposed from one side of the housing and the retaining unit is retained in the second positioning recess.

20 Claims, 18 Drawing Sheets

ELECTRONIC DEVICE

CROSS-REFERENCE TO RELATED APPLICATION

This application claims priority of Taiwanese Application No. 097220637, filed on Nov. 18, 2008.

BACKGROUND OF THE INVENTION

1. Field of the Invention

The invention relates to an electronic device having a plurality of display screens, more particularly to an electronic device having a plurality of display screens that are interconnected slidably through a slide mechanism.

2. Description of the Related Art

Since a conventional notebook computer is generally provided with a single display screen, a user needs to switch among windows when viewing different graphical screens or processing different files of data at the same time. Such switching operation not only causes inconvenience to the user but also fails to satisfy user requirements.

Referring to FIG. 1, which shows a notebook computer 1 as disclosed in U.S. Pat. No. 6,343,006B1. The notebook computer 1 includes a first display screen 11, and a second display screen 13 assembled to a rear face of the first display screen 11 through two arm portions 12. The second display screen 13 is slidable relative to the first display screen 11 such that a user may view the first and second display screens 11, 13 simultaneously.

SUMMARY OF THE INVENTION

An object of the present invention is to provide an electronic device having a plurality of display screens. The display screens of the electronic device are interconnected through a slide mechanism.

Another object of the present invention is to provide an electronic device having a plurality of display screens, and a slide mechanism which has a good sliding effect and can effectively reduce friction during sliding.

The aforesaid objects of the present invention and solutions to technical problems associated therewith are realized using the technical means described hereinbelow. The electronic device according to the present invention includes a first screen, a second screen, and a slide mechanism.

The first screen includes a housing having front and rear faces, and a first display panel disposed on the front face of the housing. The second screen is disposed on the rear face of the housing and includes a second display panel. The slide mechanism includes two slide rails connected to the rear face of the housing and spaced apart from each other, and a slide frame connected slidably to the slide rails and coupled to the second display panel. One of the slide rails has a first positioning recess and a second positioning recess spaced apart from the first positioning recess. The slide frame has a plurality of rollers connected slidably to each of the slide rails, and a retaining unit. The slide frame is capable of bringing the second display panel to move between an initial position where the second display panel is located on the rear face of the housing and the retaining unit is retained in the first positioning recess, and an open position where the second display panel is exposed from one side of the housing and the retaining unit is retained in the second positioning recess.

The objects of the present invention and the solutions to the technical problems associated therewith may be further realized using the following technical means.

In the aforesaid electronic device, each of the slide rails extends transversely, and the slide frame is capable of bringing the second display panel to slidably move from the initial position to the open position along a transverse direction.

In the aforesaid electronic device, one of the slide rails further has a stop member for abutment by the slide frame at the open position.

In the aforesaid electronic device, one of the slide rails is proximate to a bottom end of the housing, and the other of the slide rails is proximate to a top end of the housing. The slide frame further has a pin disposed proximate to a bottom end thereof. The retaining unit includes a movable rod, and a wheel connected pivotally to the movable rod and to be retained in a selected one of the first and second positioning recesses. The movable rod has an elongated guide hole for extension of the pin therethrough. The elongated guide hole includes a first end distal from the wheel, and a second end proximate to the wheel. The pin is located at the first end when the wheel is retained in the selected one of the first and second positioning recesses. Said one of the slide rails that is proximate to the bottom end of the housing has the first and second positioning recesses. The wheel is located intermediate of the rollers connected slidably to said one of the slide rails that is proximate to the bottom end of the housing.

In the aforesaid electronic device, the retaining unit further includes a restoring spring that constantly biases the movable rod such that the pin is located at the first end.

In the aforesaid electronic device, each of the slide rails has a base wall for contacting by corresponding ones of the rollers, and two sidewalls extending respectively from two opposite sides of the base wall in a same direction. The slide frame further has a plurality of limiting studs that are connected slidably and respectively to the slide rails. Each of the limiting studs abuts against the two sidewalls of the respective one of the slide rails.

In the aforesaid electronic device, the first screen further includes four threaded posts projecting from the rear face of the housing thereof, and four screws. Each of the slide rails is engaged with two corresponding ones of the threaded posts and has two through holes located at two opposite ends thereof. Each of the screws extends through a respective one of the through holes and engages a respective one of the threaded posts. A clearance is present between each of the screws and the respective one of the through holes.

In the aforesaid electronic device, the second display panel is connected pivotally to the slide frame such that the second display panel is pivotable relative to the slide frame at the open position.

In the electronic device of the present invention, due to the configuration of the slide mechanism, the second display panel of the second screen is slidable between the initial position and the open position in a steady and smooth manner, which not only can achieve a good sliding effect but can also effectively reduce friction during sliding.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
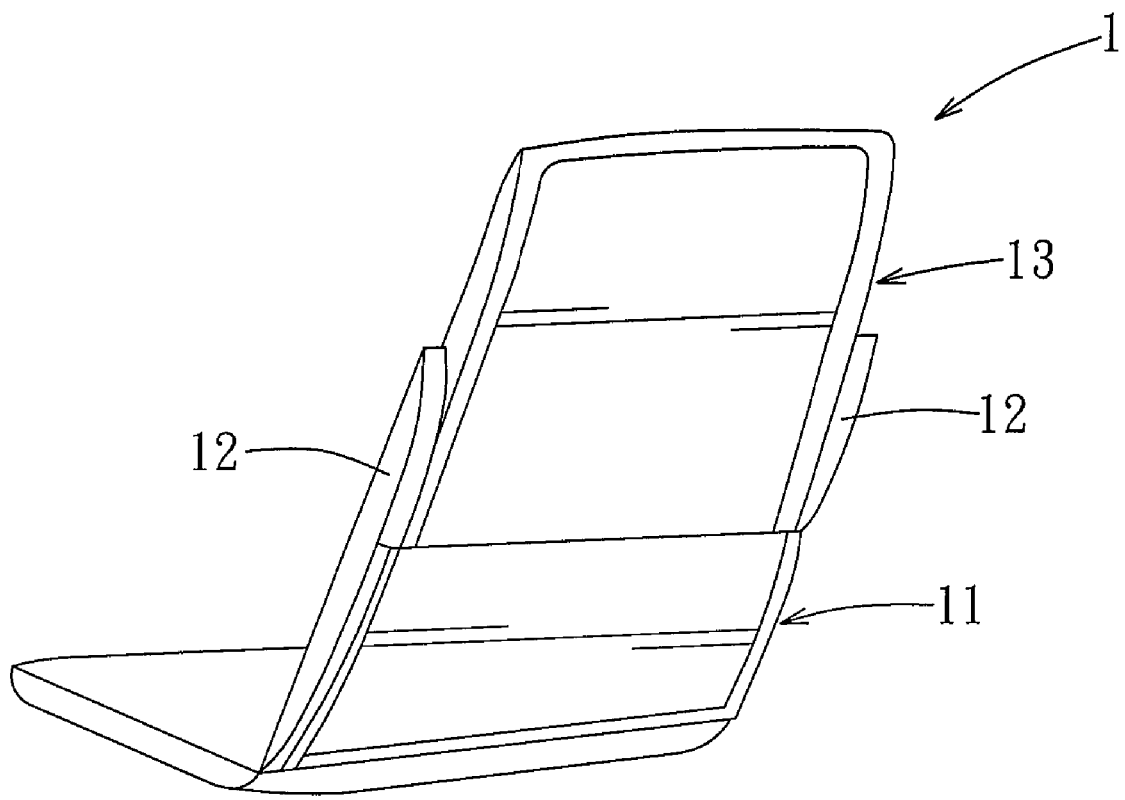
FIG. 1 is a perspective view of a conventional notebook computer.

Through a description of the preferred embodiments, the technical means employed by the present invention to achieve the intended objects, and the advantageous effects contemplated thereby, can be better understood and appreciated. It is noted that the accompanying drawings are for illustration and reference only, and are not intended to limit the scope of the present invention.

Before the present invention is described in greater detail, it should be noted that like elements are denoted by the same reference numerals throughout the disclosure.

Figure 2:
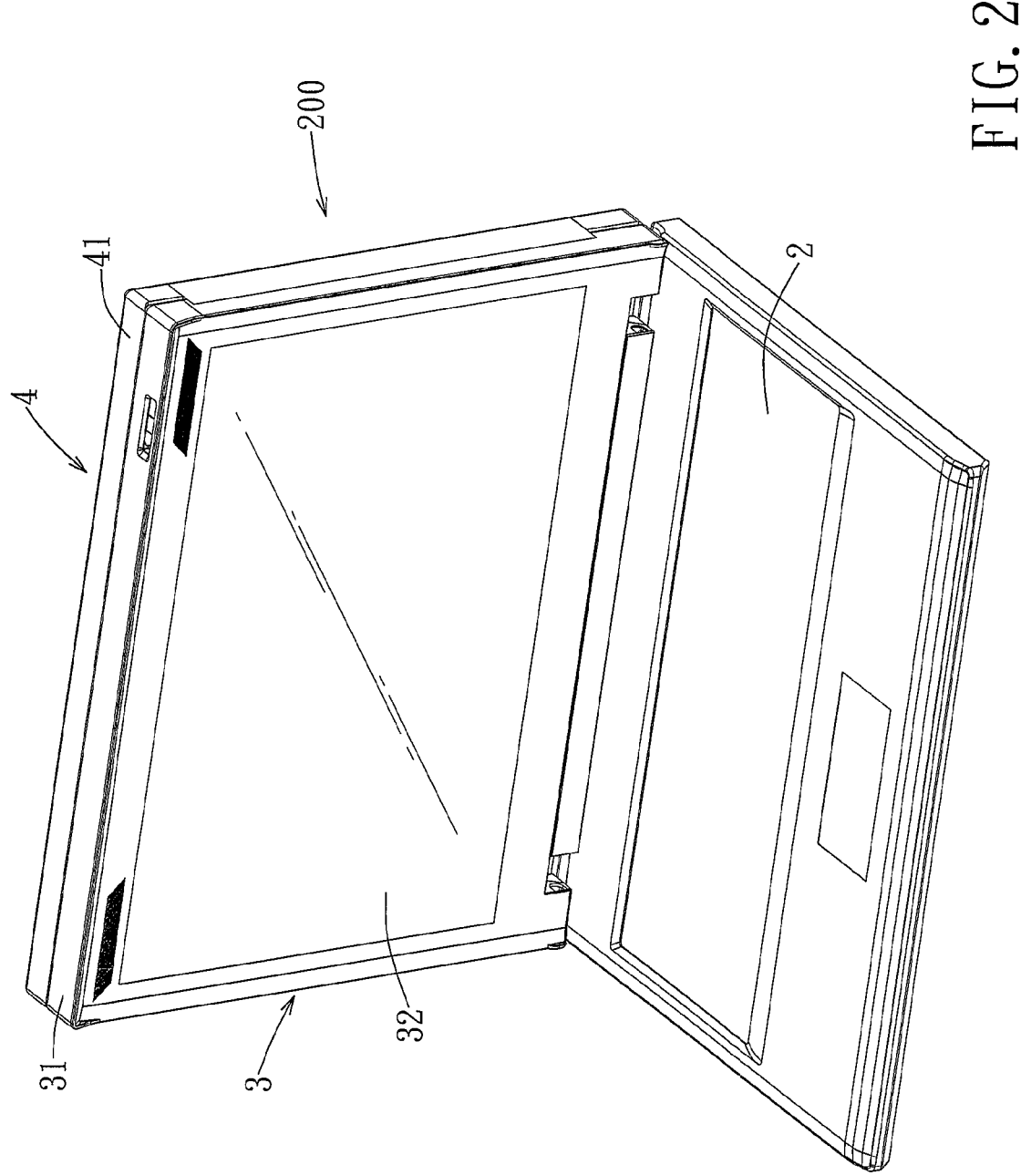
FIG. 2 is a perspective view of a first preferred embodiment of an electronic device according to the invention.
Figure 3:
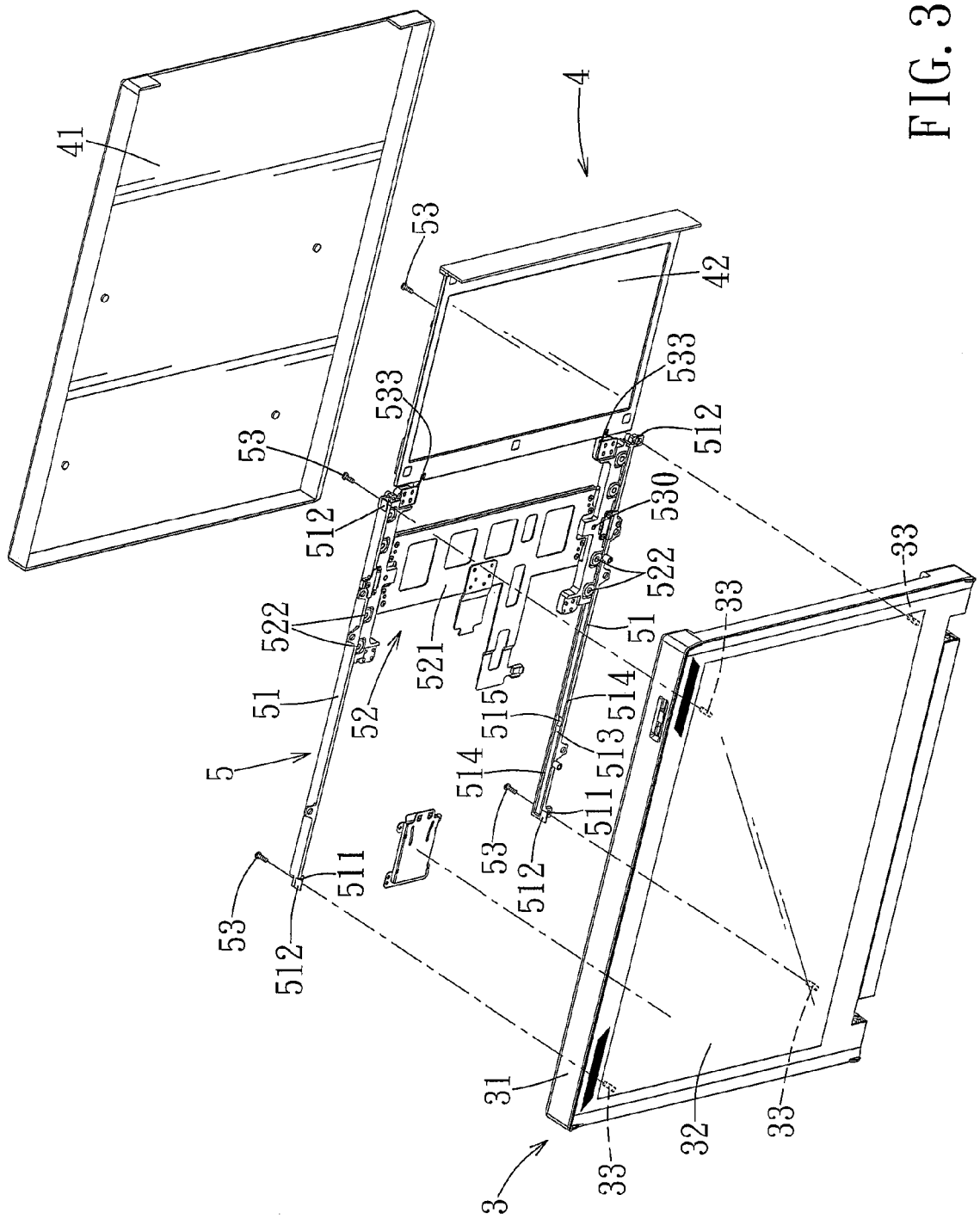
FIG. 3 is an exploded perspective view of the first preferred embodiment to illustrate the assembly relationships among a first screen, a second screen, and a slide mechanism.

Referring to FIGS. 2 and 3, the first preferred embodiment of an electronic device 200 according to the invention is a notebook computer and includes a body 2, a first screen 3 connected pivotally to a rear end of the body 2, a second screen 4 stacked upon a rear face of the first screen 3, and a slide mechanism 5 interposed between the first and second screens 3, 4.

Figure 4:
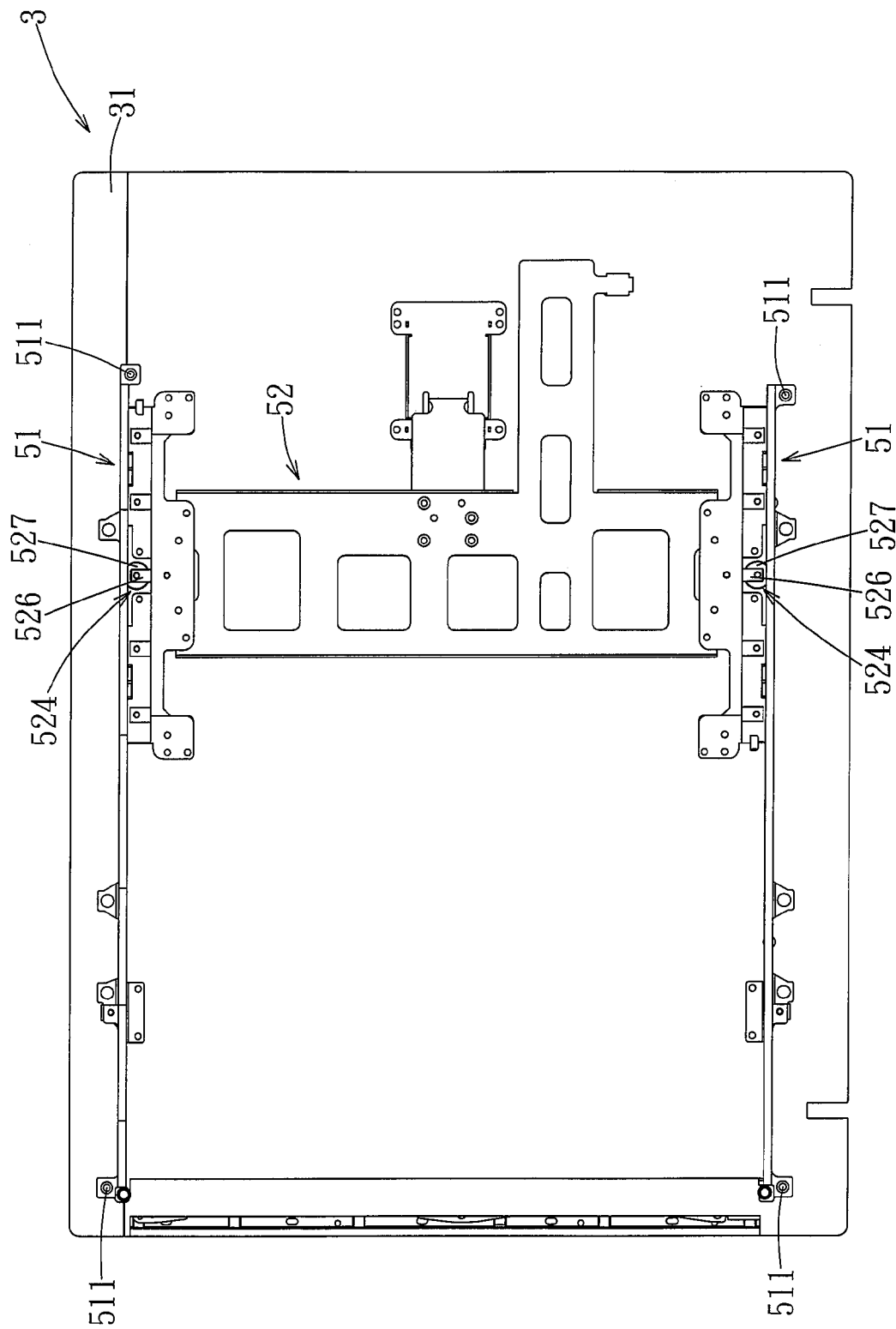
FIG. 4 is a rear view of the first preferred embodiment to illustrate slide rails of the slide mechanism that are positioned on a rear face of a housing of the first screen.
Figure 5:
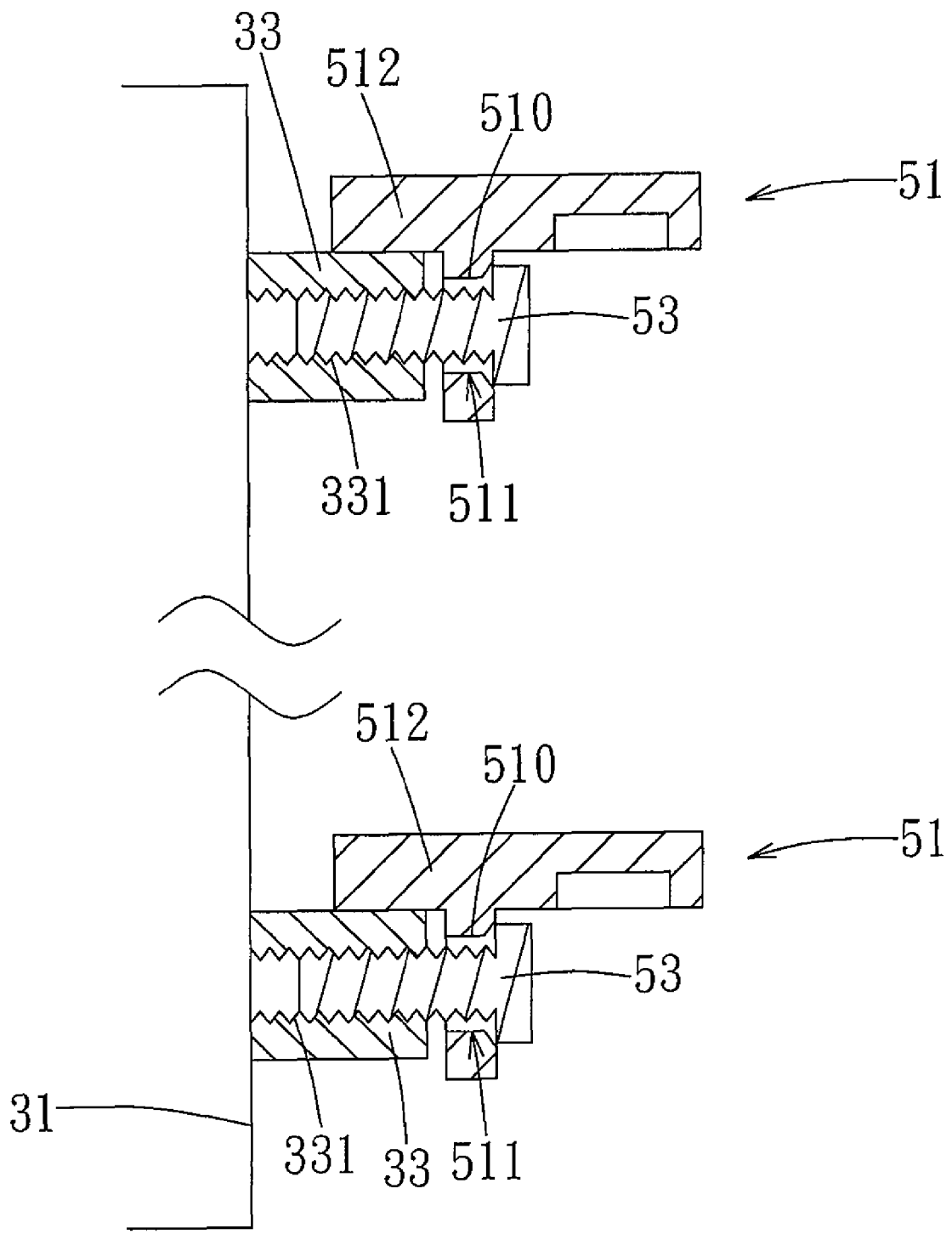
FIG. 5 is a schematic fragmentary sectional view of the first preferred embodiment to illustrate how the slide rails are positioned on threaded posts.
Figure 6:
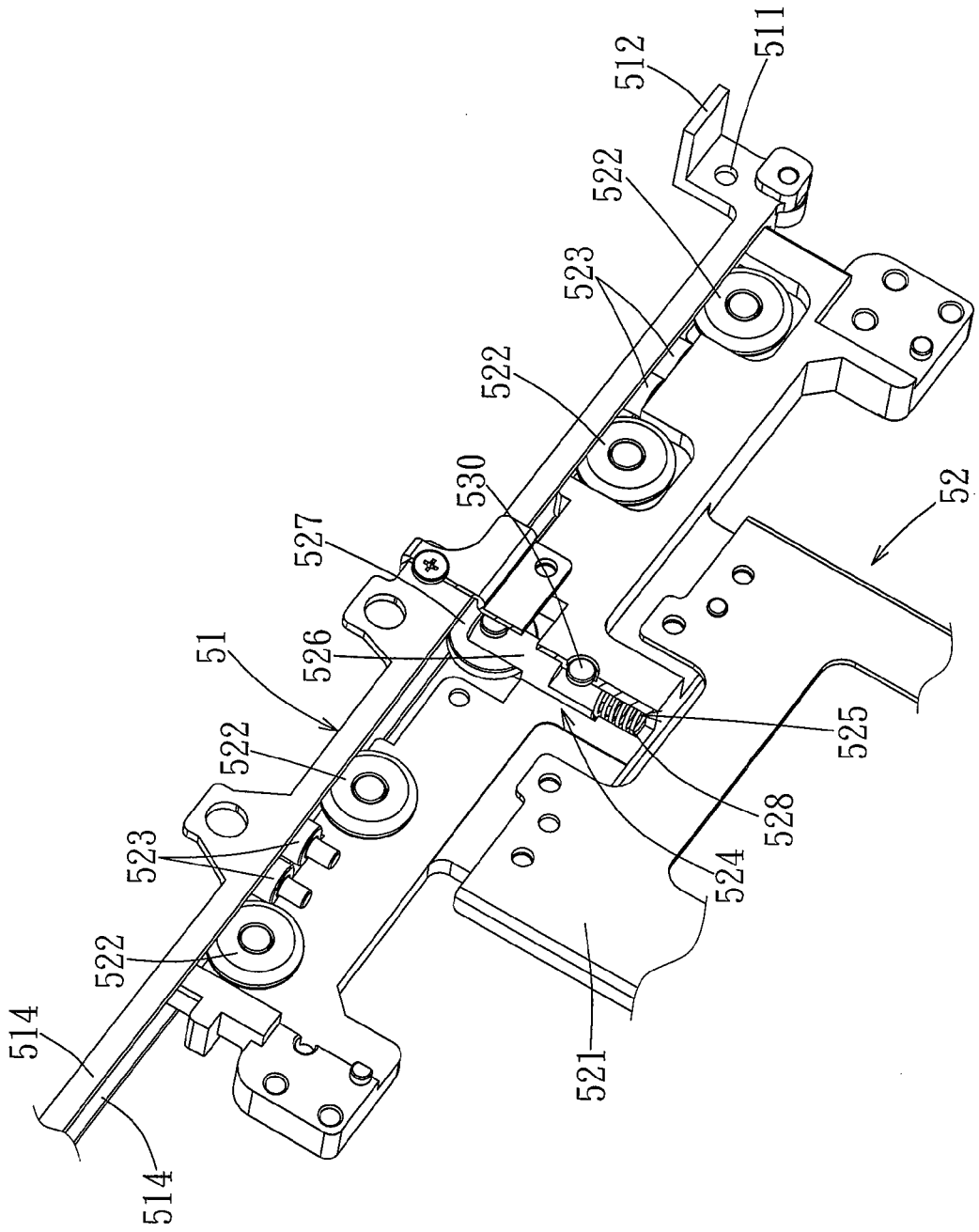
FIG. 6 is a schematic fragmentary perspective view of the first preferred embodiment to illustrate how a retaining unit is assembled.
Figure 7:
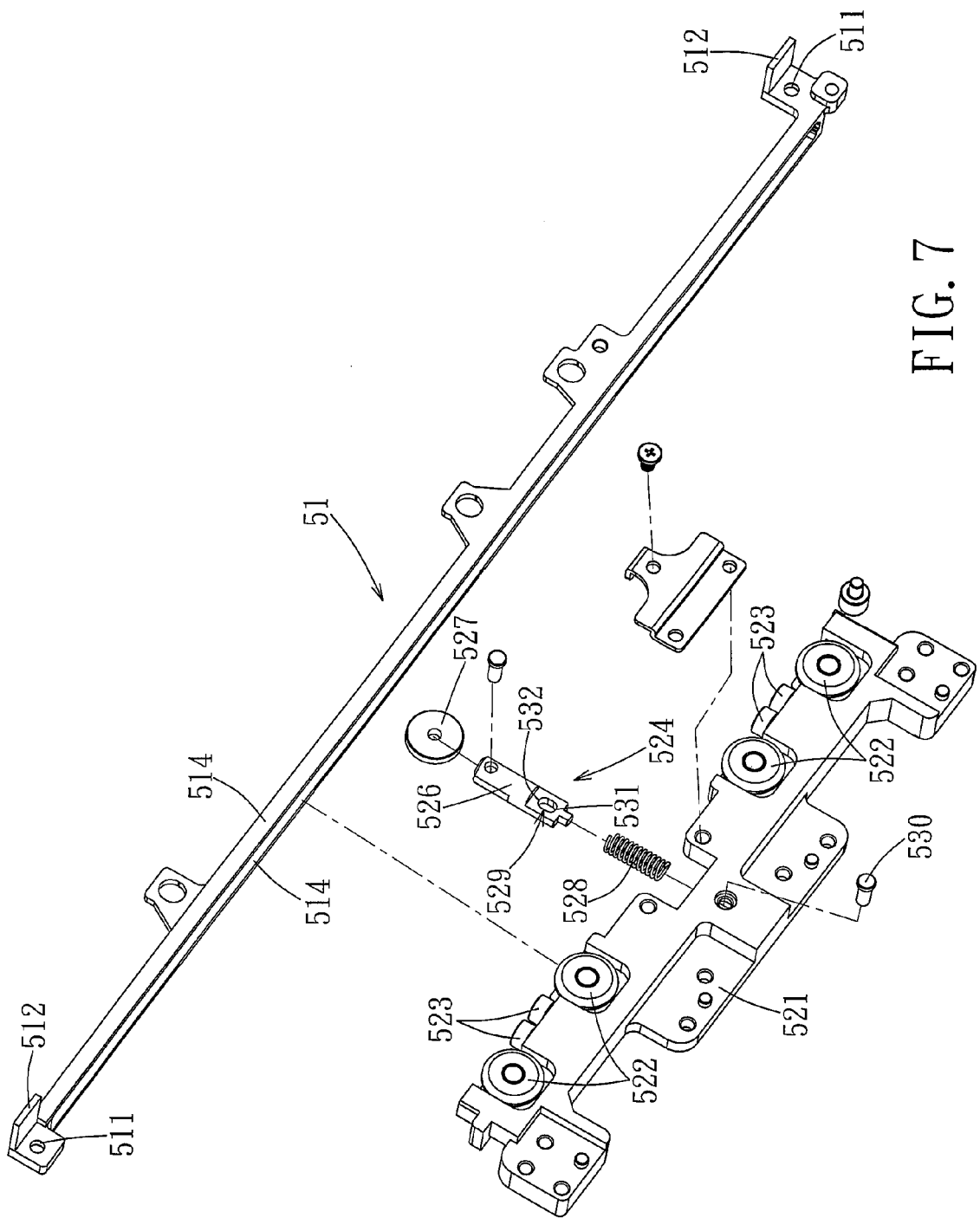
FIG. 7 is an exploded perspective view of the first preferred embodiment to illustrate assembly of the retaining unit.
Figure 8:
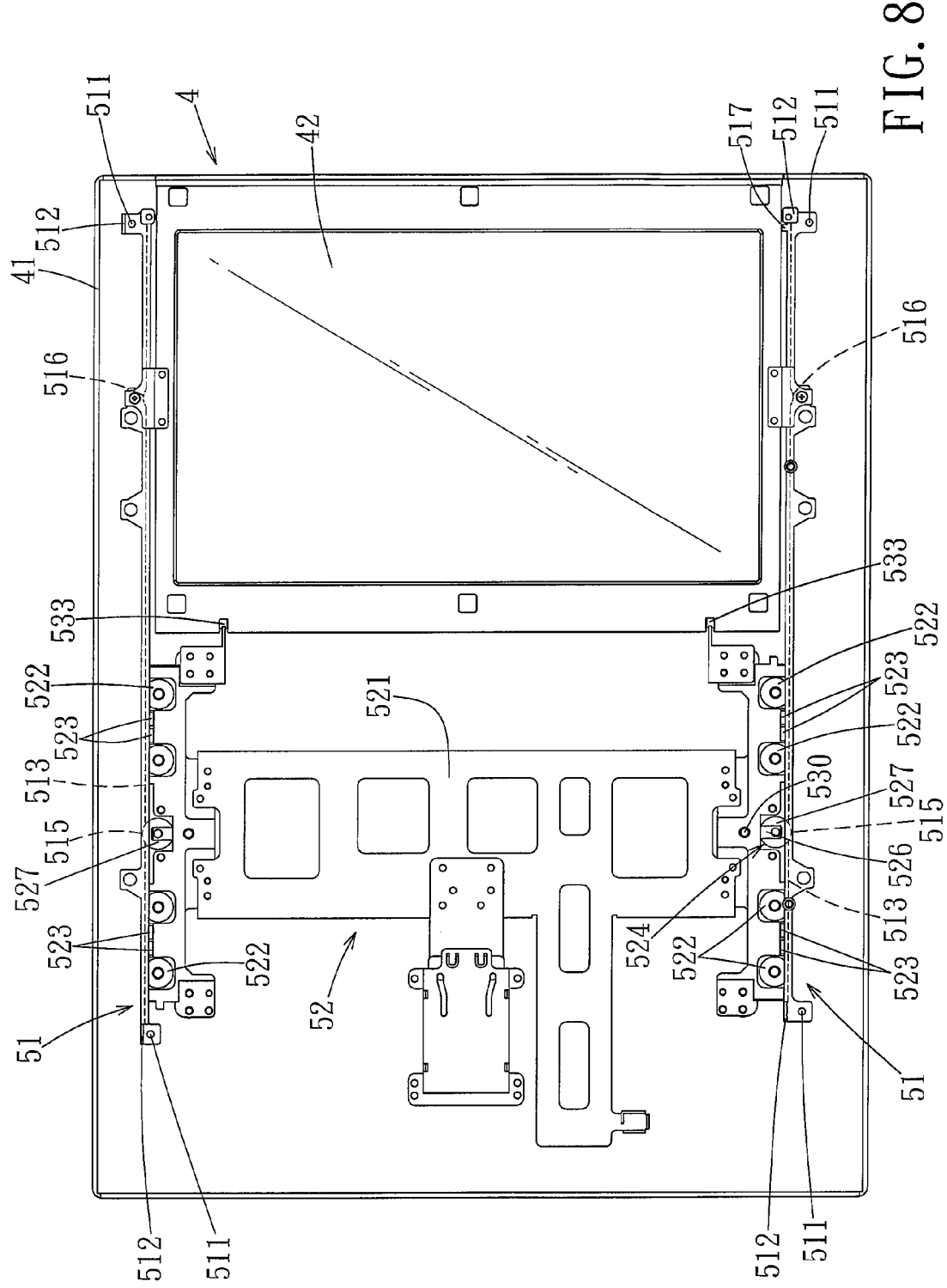
FIG. 8 is a front view of the first preferred embodiment, illustrating a second display panel at an initial position where a wheel of the retaining unit is retained in a first positioning recess in the slide rail.

Referring to FIGS. 3, 4 and 5, the first screen 3 includes a housing 31 and a first display panel 32 disposed on a front face of the housing 31. The second screen 4 includes a housing 41, and a second display panel 42 disposed on a front face of the housing 41. The slide mechanism 5 includes two slide rails 51 and a slide frame 52. The two slide rails 51 are assembled to a rear face of the housing 31 of the first screen 3, and are spaced apart with one above the other. The slide frame 52 is secured to the front face of the housing 41 of the second screen 4, and is connected pivotally to the second display panel 42. By connecting the slide frame 52 slidably to the two slide rails 51, the slide frame 52 is capable of bringing the second display panel 42 to slide relative to the first screen 3 along a direction of extension of the slide rails 51.

The two slide rails 51 are respectively adjacent to a bottom end of the housing 31 and a top end of the housing 31. Each of the slide rails 51 is in the form of an elongated strip that extends transversely. Each of the slide rails 51 has two through holes 511 located at opposite left and right ends thereof, and two engaging portions 512 located at the opposite left and right ends thereof.

The rear face of the housing 31 of the first screen 3 is provided with four threaded posts 33 projecting therefrom. Each of the threaded posts 33 has a threaded hole 331. The engaging portions 512 of each of the slide rails 51 are for engaging corresponding ones of the threaded posts 33, and the through holes 511 in each of the slide rails 51 correspond in position to the threaded holes 331 in corresponding ones of the threaded posts 33. By inserting screws 53 through the respective through holes 511 to engage the threaded holes 331 in the respective threaded posts 33, the slide rails 51 may be positioned on the rear face of the housing 31. A clearance is present between each of the screws 53 and an inner wall 510 defining the respective one of the through holes 511 in each of the slide rails 51 such that each of the slide rails 51 is positioned on the rear face of the housing 31 in a floating state. Thus, dimensional tolerances generated during manufacture of the housing 31 of the first screen 3 and assembly errors generated during the process of assembling the slide rails 51 may be absorbed, such that the slide rails 51 may float with the slide frame 52 during sliding of the slide frame 52 along the slide rails 51, thereby resulting in relative smooth sliding movement of the slide frame 52 and avoiding jamming of the slide frame 52.

Referring to FIGS. 3, 6, 7, and 8, each of the slide rails 51 further has a base wall 513, and two sidewalls 514 extending respectively from opposite front and rear sides of the base wall 513 in a same direction. The slide frame 52 has an I-shaped frame body 521, a plurality of rollers 522 provided pivotally at upper and lower ends of the frame body 521, and a plurality of limiting studs 523 provided pivotally and respectively on the upper and lower ends of the frame body 521. The rollers 522 of the slide frame 52 are connected slidably to the base walls 513 of the slide rails 51. Each of the limiting studs 523 abuts against the two sidewalls 514 of a respective one of the slide rails 51, and is in point contact with an inner wall surface of the two sidewalls 514, whereby forward or rearward wobbling of the slide frame 52 can be checked, and rubbing between the rollers 522 and the sidewalls 514 which may obstruct smooth sliding can be prevented.

The slide frame 52 further has two retaining units 524 disposed respectively at the upper and lower ends of the frame body 521. In this embodiment, the slide frame 52 has four rollers 522 at each of the upper and lower ends thereof, and each of the retaining units 524 is located intermediate of the four rollers 522. Each of the retaining units 524 includes a movable rod 526 extending into a receiving recess 525 in the frame body 521, a wheel 527 connected pivotally to the movable rod 526 and connected slidably to the base wall 513 of a respective one of the slide rails 51, and a restoring spring 528 sleeved on the movable rod 526 and abutting against a wall defining the receiving recess 525. The movable rod 526 has an elongated guide hole 529 extending in a top-bottom direction. The movable rod 526 of each of the retaining units 524 is mounted on the frame body 521 through a pin 530 of the slide frame 52 that is extended through the elongated guide hole 529.

Figure 9:
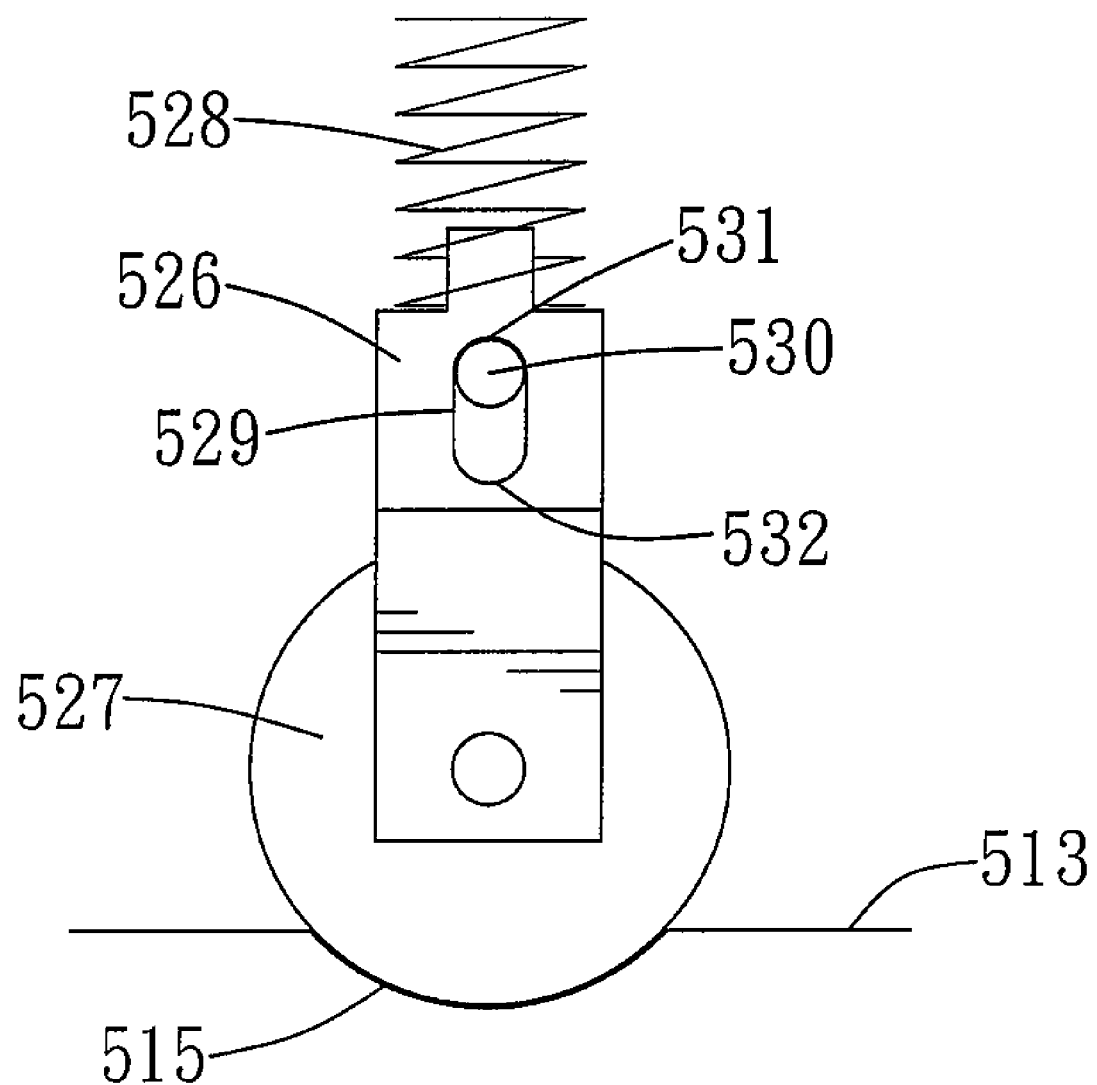
FIG. 9 is a fragmentary enlarged view of the first preferred embodiment to illustrate a pin at a first end of an elongated guide hole.
Figure 10:
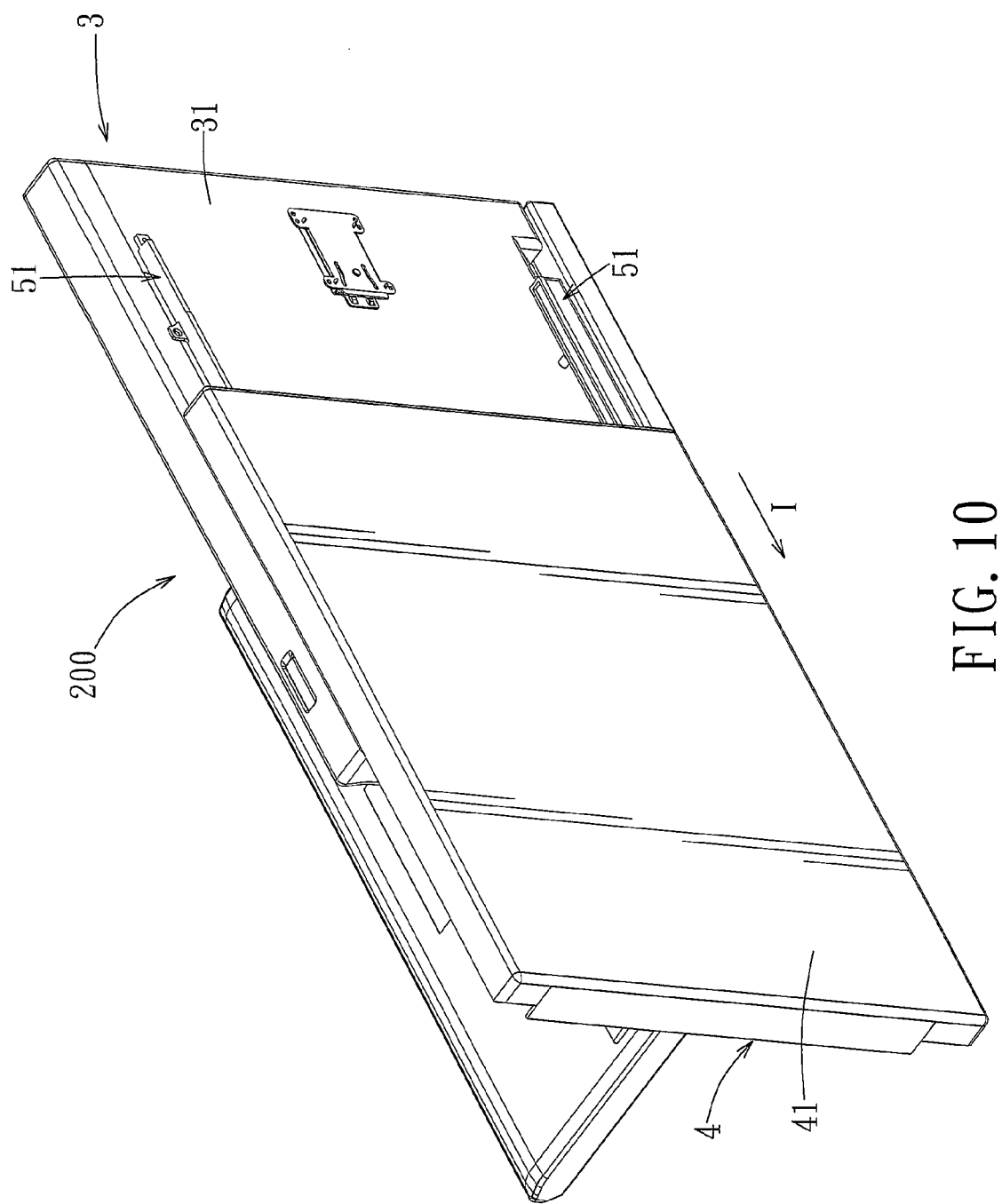
FIG. 10 is a perspective view of the first preferred embodiment to illustrate how the second screen is slid relative to the first screen in a transverse direction in use.
Figure 11:
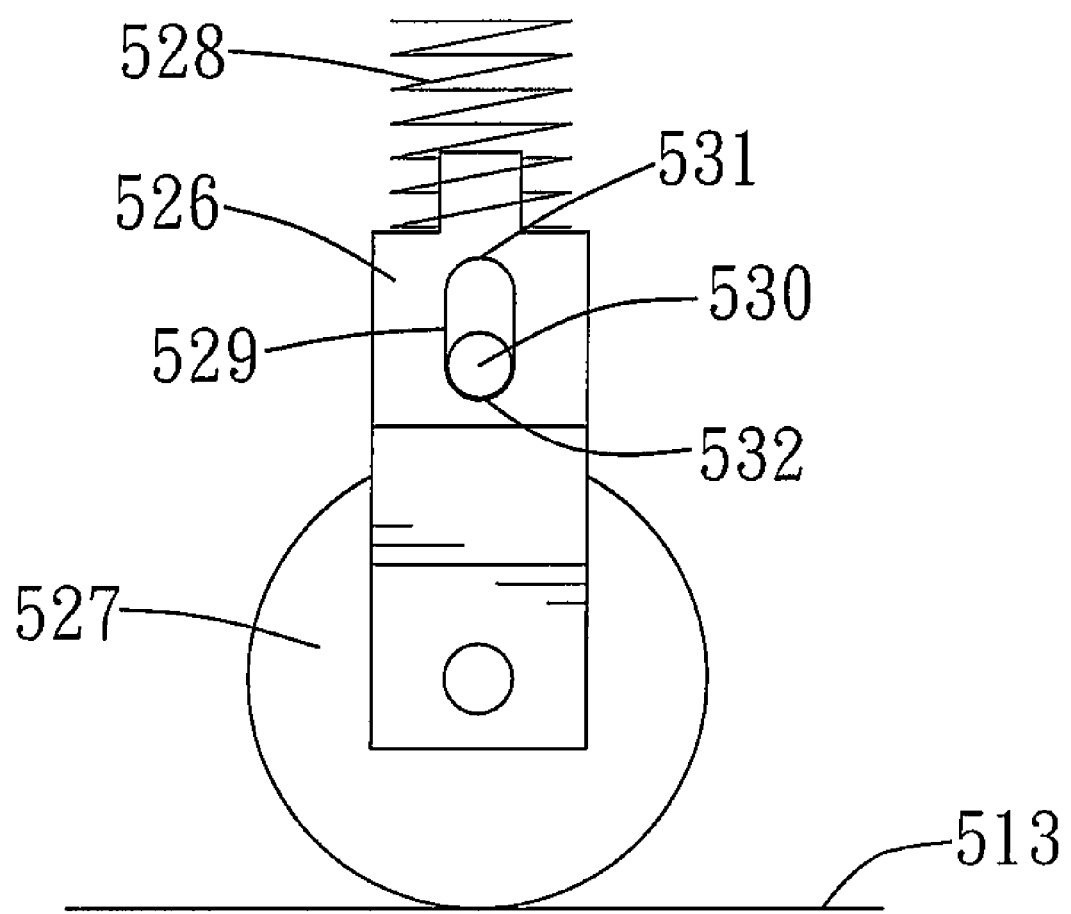
FIG. 11 is a fragmentary enlarged view of the first preferred embodiment to illustrate the pin at a second end of the elongated guide hole.
Figure 12:
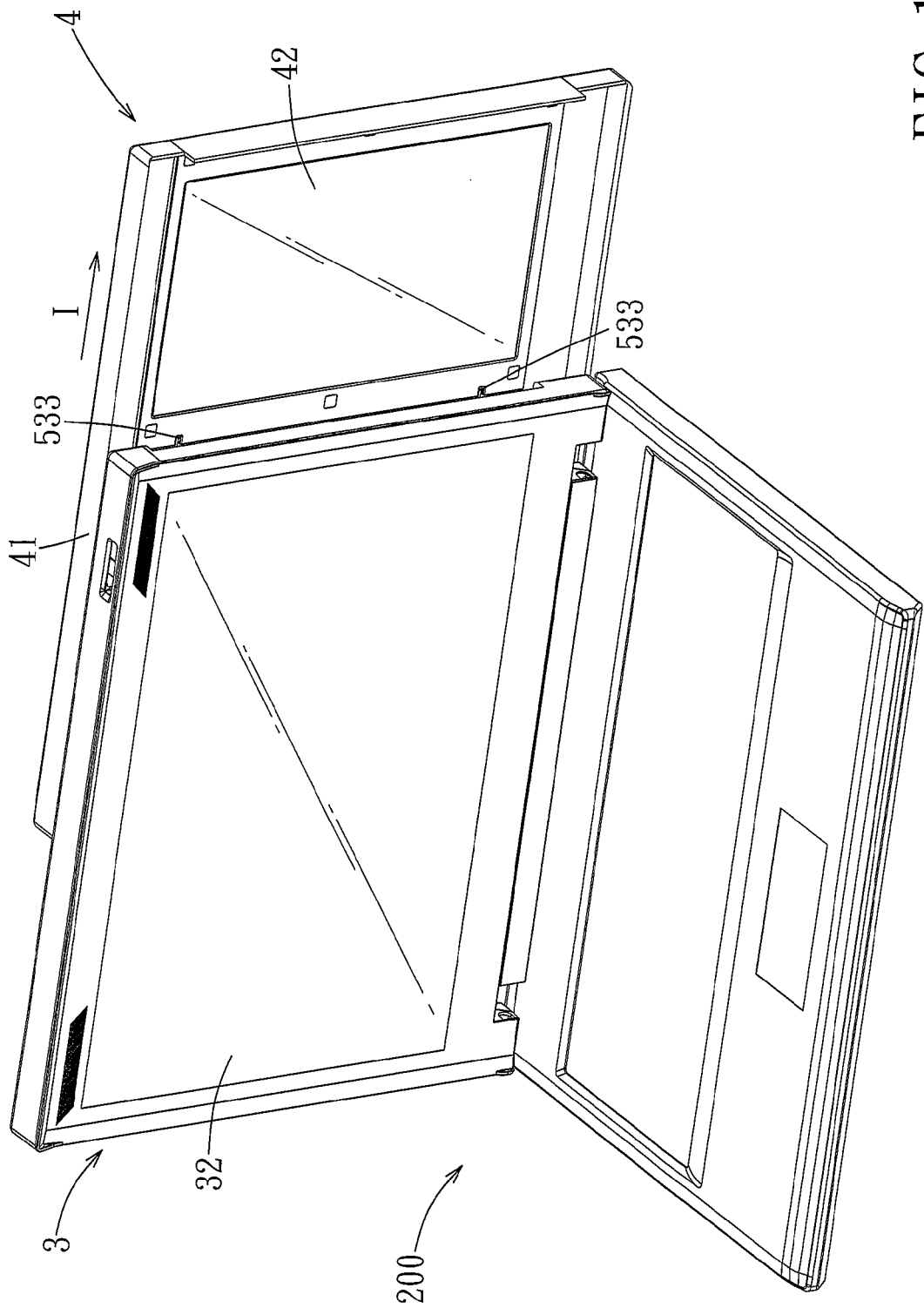
FIG. 12 is a perspective view of the first preferred embodiment to illustrate the second display panel at an open position in use.
Figure 13:
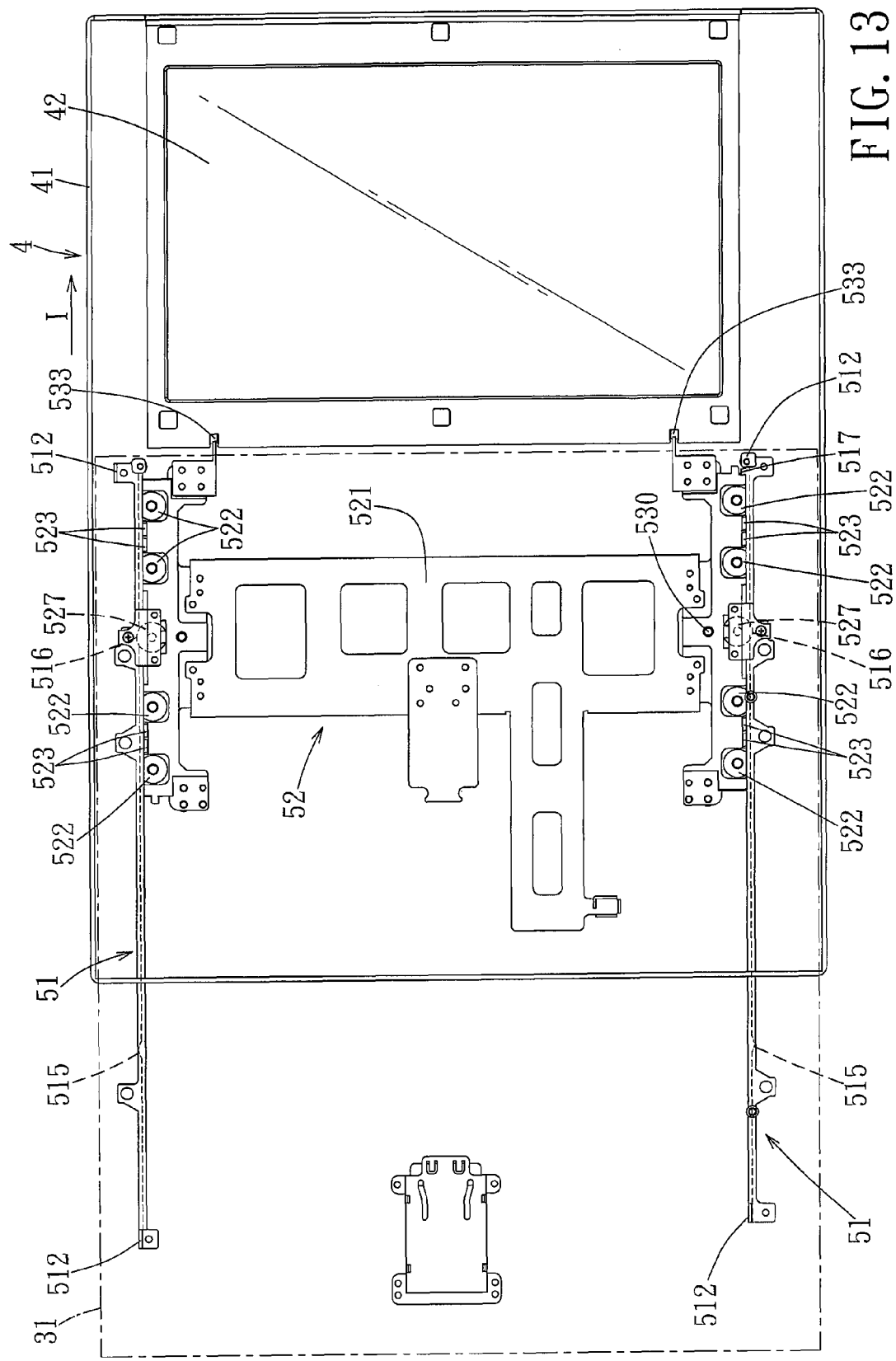
FIG. 13 is a front view of the first preferred embodiment illustrating the second display panel is at the open position and the wheels of the retaining units are retained in second positioning recesses in the slide rails.

When the wheel 527 of each of the retaining units 524 is located in a curved first positioning recess 515 (see FIGS. 3 and 8) formed in the base wall 513 of a respective one of the slide rails 51, due to the arrangement of the restoring spring 528 which constantly biases the corresponding movable rod 526 toward the base wall 513 of the respective one of the slide rails 51, the pin 530 is located at a first end 531 of the elongated guide hole 529 that is distal from the wheel 527, as shown in FIG. 9, and the wheel 527 is retained in the first positioning recess 515. At this time, the second display panel 42 is located at an initial position (see FIG. 2) at the rear face of the housing 31 of the first screen 3.

Referring to FIGS. 10, 11, 12, and 13, when a user desires to use and view the first display panel 32 of the first screen 3 and the second display panel 42 of the second screen 4 at the same time, the second screen 4 may be pulled rightward from the rear face of the housing 31 of the first screen 3 such that the second display panel 42 is brought by the slide frame 52 to move rightward from the initial position relative to the housing 31 of the first screen 3 along a transverse direction (I), and such that the wheel 527 of each of the retaining units 524 slides from the first positioning recess 515 to the base wall 513 of the respective one of the slide rails 51. When the second display panel 42 is brought by the slide frame 52 to slidably move from the initial position to an open position shown in FIG. 12, the second display panel 42 will be exposed from a right side of the housing 31 of the first screen 3, so that the user may use and view the first and second display panels 32, 42 at the same time, thereby eliminating the need to switch between windows in a single display panel of the prior art.

Figure 14:
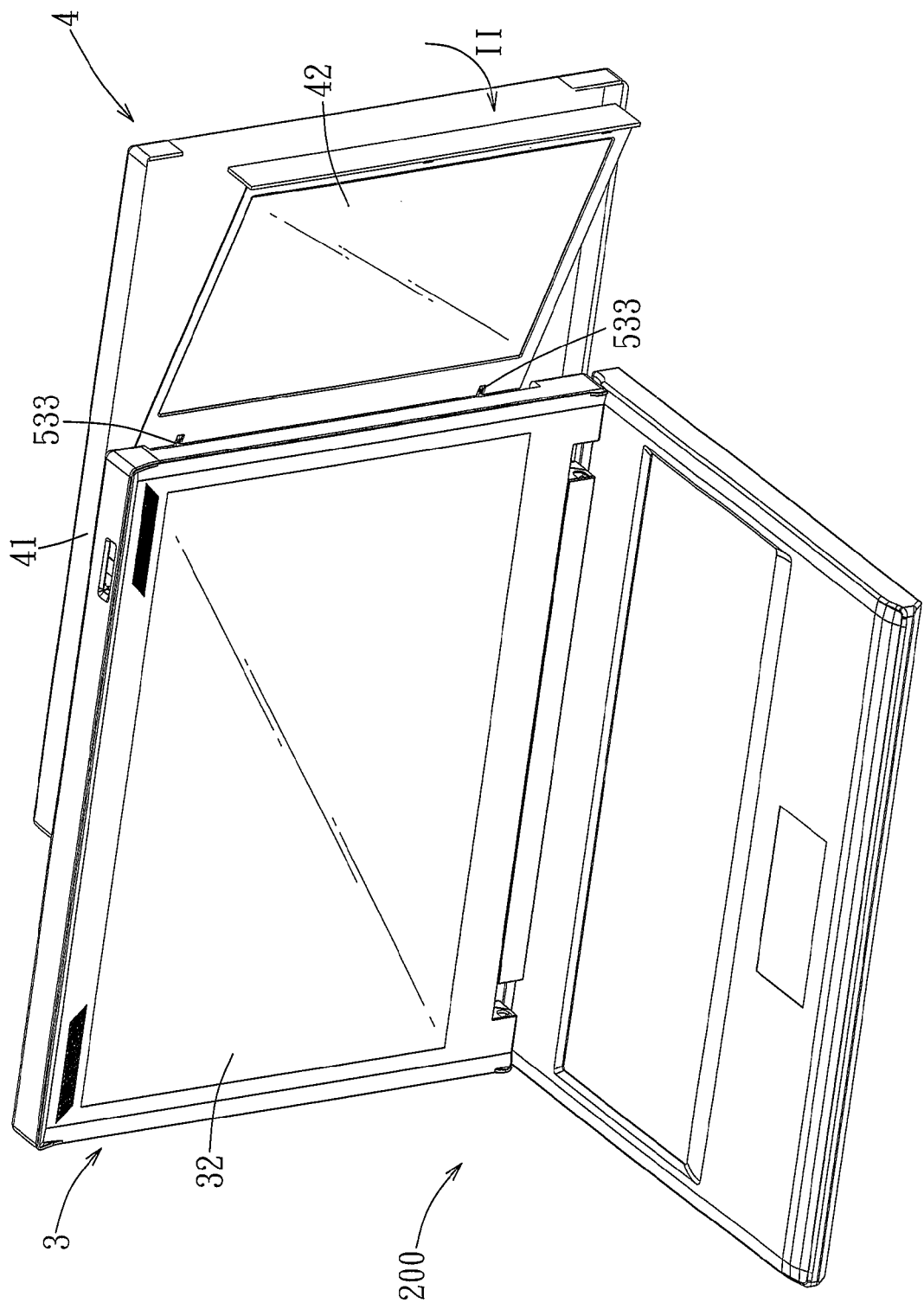
FIG. 14 is a perspective view of the first preferred embodiment to illustrate how the second display panel is pivotable forwardly via pivot portions in use.

When the second display panel 42 is at the open position, the wheel 527 of each of the retaining units 524 is retained in a curved second positioning recess 516 in the base wall 513 of the respective one of the slide rails 51. At the same time, a stop member 517 located at the right end of the bottom slide rail 51 abuts against a right end of the frame body 521 to prevent detachment of the slide frame 52 from the two slide rails 51 in case the pulling force applied to the second screen 4 by the user is excessive. In addition, at the open position, the second display panel 42 is pivotable forwardly in a direction indicated by arrow (II) using two pivot portions 533 of the slide frame 52, as shown in FIG. 14, thereby permitting the user to adjust the viewing angle of the second display panel 42.

If the user desires to move the second display panel 42 of the second screen 4 from the open position to the initial position, the second screen 4 may be pushed leftward along a direction opposite to the transverse direction (I) so that the wheel 527 of each of the retaining units 524 disengages from the corresponding second positioning recess 516. The second display panel 42 is restored to the initial position when the wheel 527 of each of the retaining units 524 is retained in the corresponding first positioning recess 515.

When the second display panel 42 is brought to slidably move by the slide frame 52, through the movable rods 526 of the retaining units 524 that are respectively pivoted to the pins 530, and through the wheels 527 that are respectively pivoted to the movable rods 526, the wheels 527 may be kept in contact with the respective base walls 513 so as to ensure relatively smooth sliding during the sliding process. In addition, since the second display panel 42 is pivoted to the pivot portions 533 at the right end of the slide frame 52, the combined weight of the second display panel 42 and the housing 41 will be exerted on a bottom end of the frame body 521 and will be concentrated on the two rollers 522 on the right side of the bottom wheel 527, so that rolling of the two rollers 522 on the right side of the bottom wheel 527 is hampered. At this time, a second end 532 of the elongated guide hole 529 in the movable rod 526 located at the bottom end of the frame body 521 will abut against the corresponding pin 530 to provide an upward counterforce to the frame body 521 so as to ensure that the other two rollers 522 on the left side of the bottom wheel 527 may be in rolling contact with the base wall 513 of the corresponding one of the slide rails 51. This, combined with the configuration of the limiting studs 523, ensures that sliding of the slide frame 52 is relatively steady and smooth. Thus, a good sliding effect may be achieved, and friction generated during sliding may be effectively reduced. Furthermore, by means of the arrangement of the rollers 522 at the upper and lower ends of the frame body 521, the limiting studs 523, and the retaining units 524, the second display panel 42 may be placed in a horizontally suspended state at the open position and will not slant to one side.

It should be noted that, in practice, similar positioning effects and steady and smooth sliding of the slide frame 52 may be achieved by providing the retaining unit 524 only at the lower end of the frame body 521, and the restoring spring 528 of the retaining unit 524 may be dispensed with. In this case, the wheel 527 may be retained in the first positioning recess 515 or the second positioning recess 516 by virtue of gravity when the wheel 527 is moved to where the first positioning recess 515 or the second positioning recess 516 is at, and should not be limited to the configuration disclosed in this embodiment. However, the provision of two retaining units 524 and the restoring springs 528 as disclosed in this embodiment provides relatively steady positioning of the slide frame 52 and ensures steadier and smoother sliding of the slide frame 52. In addition, the second screen 4 may be configured to be pulled leftward from the rear face of the housing 31 of the first screen 3, or two second screens 4 and two slide mechanisms 5 are provided on the rear face of the housing 31 of the first screen 3 such that the two second screens 4 may be pulled out from the right and the left.

Figure 15:
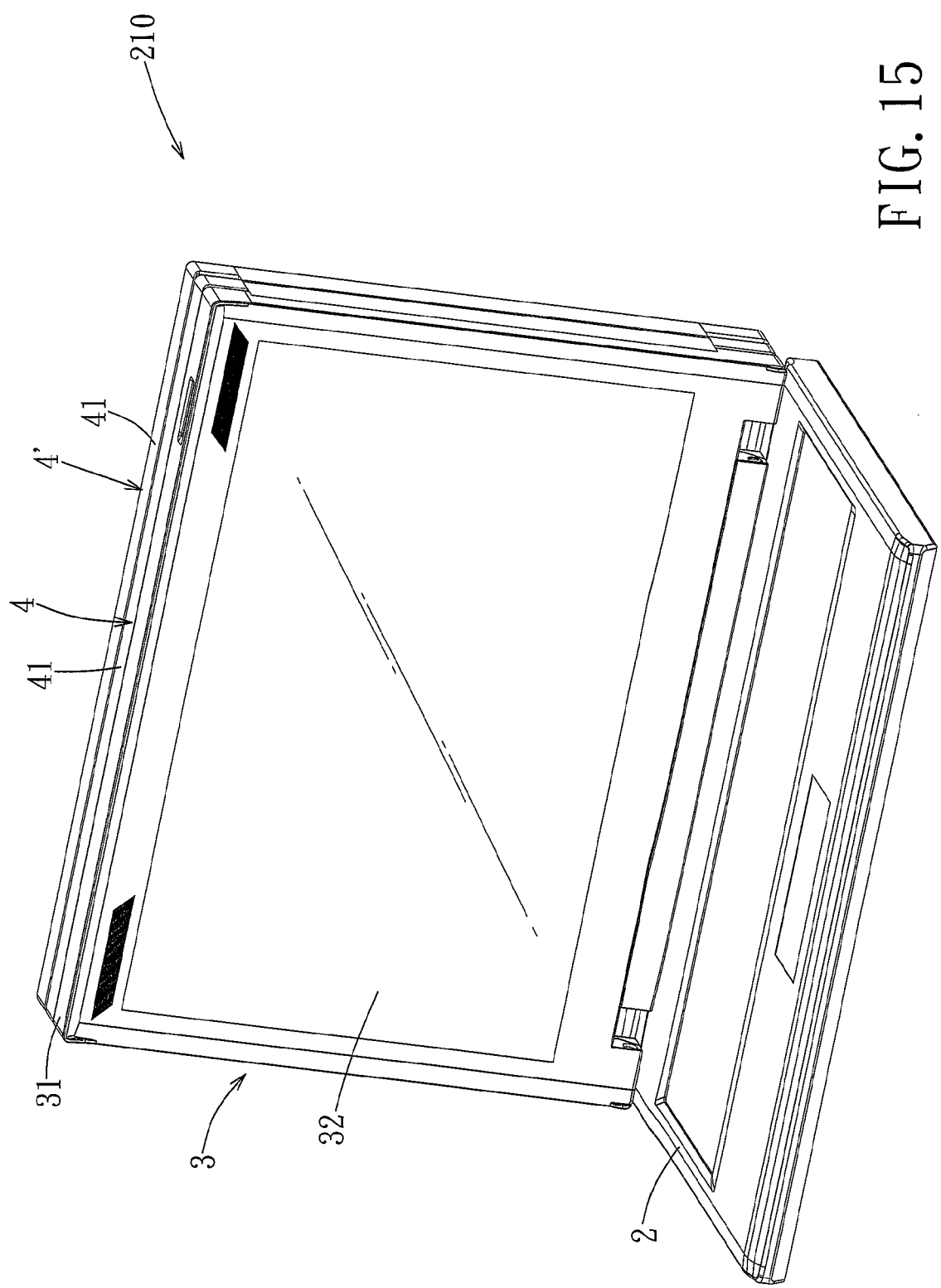
FIG. 15 is a perspective view of the second preferred embodiment of an electronic device according to the present invention.
Figure 16:
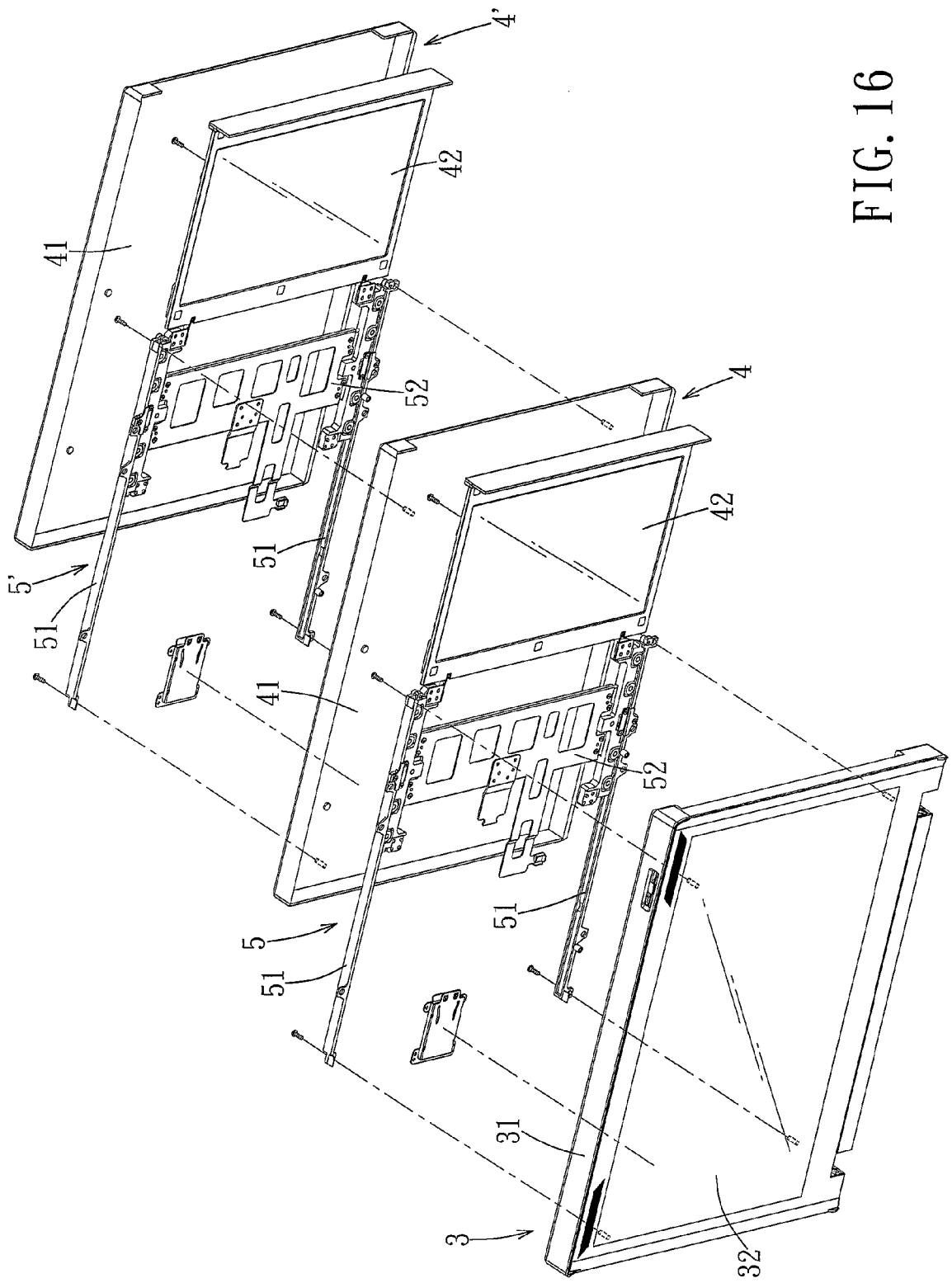
FIG. 16 is an exploded perspective view of the second preferred embodiment to illustrate the assembly relationships among a first screen, second screens, and slide mechanisms.

Referring to FIGS. 15 and 16, the second preferred embodiment of an electronic device 210 according to the present invention is substantially similar to the first preferred embodiment in overall construction and operation. The difference resides in that the electronic device 210 further includes a second screen 4' stacked on the rear face of the housing 41 of the second screen 4, and a slide mechanism 5' disposed between the second screen 4 and the second screen 4'. The slide mechanism 5' includes two slide rails 51 connected to the rear face of the housing 41 of the second screen 4 and spaced apart with one above the other, and a slide frame 52 connected slidably to the two slide rails 51 and coupled to the second display panel 41 of the second screen 4'.

Figure 17:
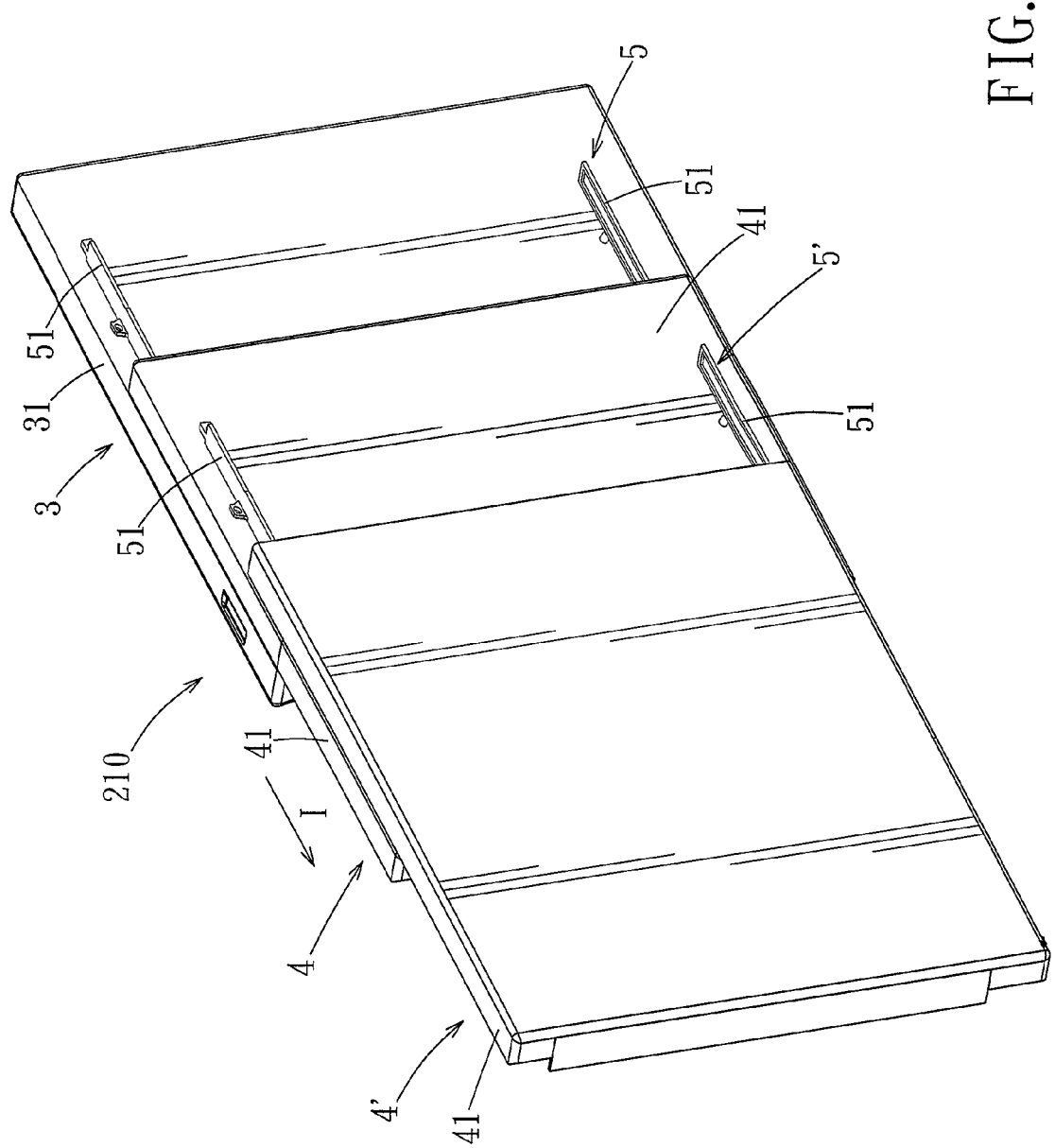
FIG. 17 is a perspective view of the second preferred embodiment in use.
Figure 18:
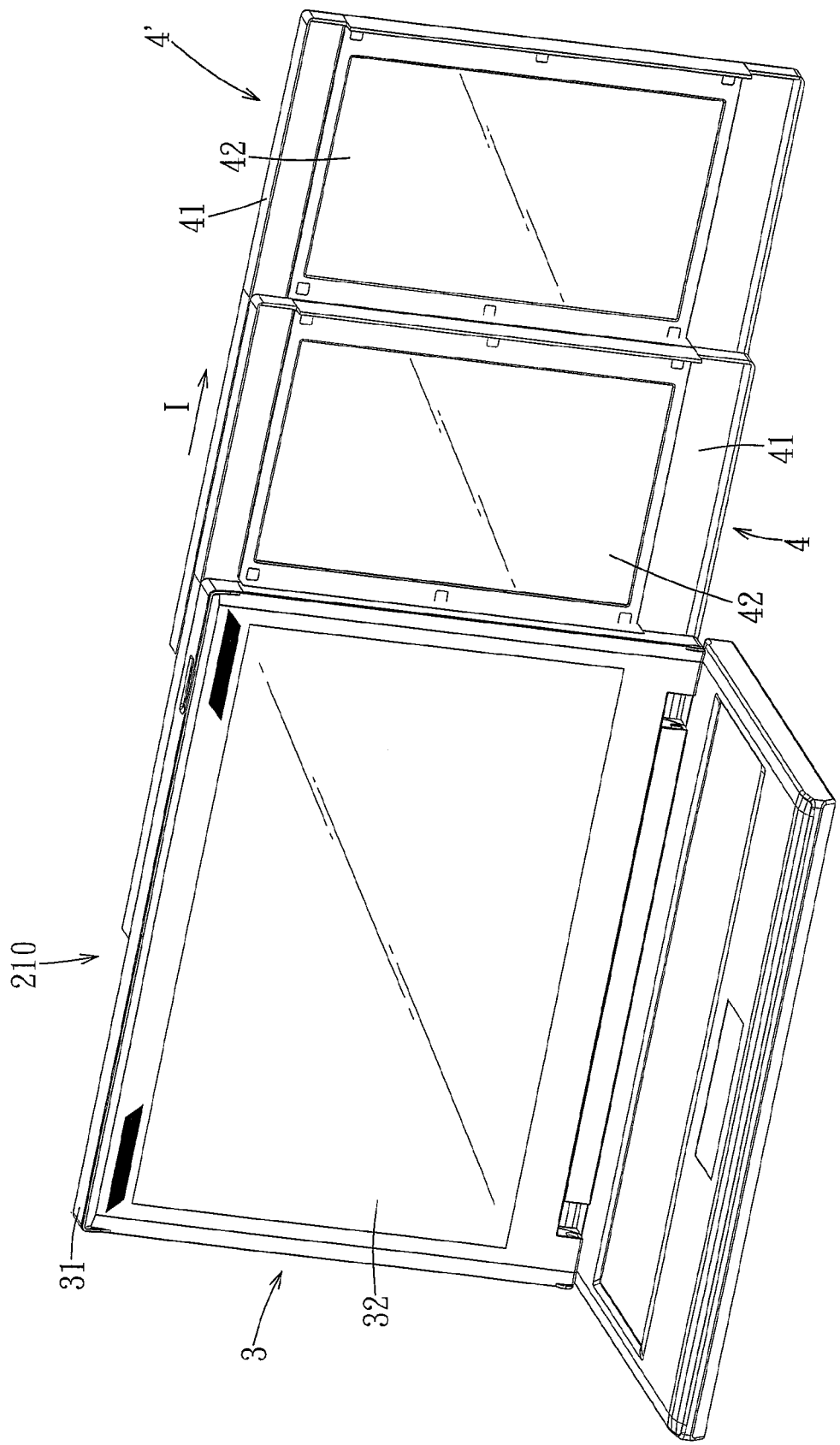
FIG. 18 is a perspective view of the second preferred embodiment illustrating the two display panels at an open position in use.

Referring to FIGS. 16, 17, and 18, the second display panel 42 of the second screen 4' may be brought by the slide frame 52 of the slide mechanism 5' to slidably move rightward relative to the housing 41 of the second screen 4 to the open position along the transverse direction (I) such that the second display panel 42 of the second screen 4' is exposed from the right side of the housing 41 of the second screen 4, thereby enabling the user to use and view the first display panel 32 of the first screen 3 and the second display panels 42 of the two second screens 4, 4' at the same time. Certainly, the number of the second screens 4, 4' may be increased depending on requirements, and should not be limited to what is disclosed in this embodiment.

In sum, in the two above-described embodiments, the configuration of the slide mechanism 5, 5' enables the second display panel 42 of the second screen 4, 4' to slidably move between initial and open positions in a steady and smooth manner, which not only can achieve a good sliding effect but can also effectively reduce friction during sliding.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements. In addition, it should be appreciated that the embodiments as described herein or any of the claims as appended hereto do not necessarily have to achieve all of the objects, advantages or features disclosed herein. Moreover, the abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims.

What is claimed is:

1. An electronic device comprising:
    a first screen including a housing having front and rear faces, and a first display panel disposed on said front face of said housing;
    a second screen disposed on said rear face of said housing and including a second display panel; and
    a slide mechanism including
        two slide rails connected to said rear face of said housing and spaced apart from each other, wherein one of said slide rails has a first positioning recess and a second positioning recess spaced apart from said first positioning recess, and
        a slide frame connected slidably to said slide rails and coupled to said second display panel, wherein said slide frame has a plurality of rollers connected slidably to each of said slide rails, and a retaining unit,
        whereby said slide frame is capable of bringing said second display panel to move between an initial position where said second display panel is located on said rear face of said housing, and said retaining unit is retained in said first positioning recess, and an open position where said second display panel is exposed from one side of said housing, and said retaining unit is retained in said second positioning recess.

2. The electronic device of claim 1, wherein each of said slide rails extends transversely, said slide frame being capable of bringing said second display panel to slidably move from the initial position to the open position along a transverse direction.

3. The electronic device of claim 1, wherein one of said slide rails further has a stop member for abutment by said slide frame at the open position.

4. The electronic device of claim 1, wherein said slide frame further has a pin, and said retaining unit includes a movable rod, and a wheel connected pivotally to said movable rod and to be retained in a selected one of said first and second positioning recesses, said movable rod having an elongated guide hole for extension of said pin therethrough, said elongated guide hole including a first end distal from said wheel, and a second end proximate to said wheel, said pin being located at said first end when said wheel is retained in the selected one of said first and second positioning recesses.

5. The electronic device of claim 4, wherein said retaining unit further includes a restoring spring that constantly biases said movable rod such that said pin is located at said first end.

6. The electronic device of claim 1, wherein each of said slide rails has a base wall for contacting by corresponding ones of said rollers, and two sidewalls extending respectively from two opposite sides of said base wall in a same direction, said slide frame further having a plurality of limiting studs that are connected slidably and respectively to said slide rails, each of said limiting studs abutting against said two sidewalls of the respective one of said slide rails.

7. The electronic device of claim 1, wherein said first screen further includes four threaded posts projecting from said rear face of said housing thereof, and four screws, each of said slide rails being engaged with two corresponding ones of said threaded posts and having two through holes located at two opposite ends thereof, each of said screws extending through a respective one of said through holes and engaging a respective one of said threaded posts, a clearance being present between each of said screws and the respective one of said through holes.

8. The electronic device of claim 2, wherein one of said slide rails is proximate to a bottom end of said housing, and the other of said slide rails is proximate to a top end of said housing, said slide frame further having a pin disposed proximate to a bottom end thereof, said retaining unit including a movable rod, and a wheel connected pivotally to said movable rod and to be retained in a selected one of said first and second positioning recesses, said movable rod having an elongated guide hole for extension of said pin therethrough, said elongated guide hole including a first end distal from said wheel and a second end proximate to said wheel, said pin being located at said first end when said wheel is retained in the selected one of said first and second positioning recesses.

9. The electronic device of claim 8, wherein said one of said slide rails that is proximate to said bottom end of said housing has said first and second positioning recesses, said wheel being located intermediate of said rollers connected slidably to said one of said slide rails that is proximate to said bottom end of said housing.

10. The electronic device of claim 8, wherein said retaining unit further includes a restoring spring that constantly biases said movable rod such that said pin is located at said first end.

11. The electronic device of claim 8, wherein one of said slide rails further has a stop member for abutment by said slide frame at the open position.

12. The electronic device of claim 9, wherein each of said slide rails has a base wall for contacting by corresponding ones of said rollers, and two sidewalls extending respectively from two opposite sides of said base wall in a same direction, said slide frame further having a plurality of limiting studs that are connected slidably and respectively to said slide rails, each of said limiting studs abutting against said two sidewalls of the respective one of said slide rails.

13. The electronic device of claim 9, wherein said first screen further includes four threaded posts projecting from said rear face of said housing thereof, and four screws, each of said slide rails being engaged with two corresponding ones of said threaded posts and having two through holes located at two opposite ends thereof, each of said screws extending through a respective one of said through holes and engaging a respective one of said threaded posts, a clearance being present between each of said screws and the respective one of said through holes.

14. The electronic device of claim 9, wherein said second display panel is connected pivotally to said slide frame such that said second display panel is pivotable relative to said slide frame at the open position.

15. An electronic device comprising:
a first screen including a housing having front and rear faces, and a first display panel disposed on said front face of said housing;
a plurality of second screens stacked upon each other and disposed on said rear face of said housing, each of said second screens including a housing having a front face, and a second display panel disposed on said front face of said housing of a respective one of said second screens; and
a plurality of slide mechanisms, one of said slide mechanisms being disposed between said first screen and one of said second screens and being connected to said rear face of said housing of said first screen, each other one of said slide mechanisms being disposed between a respective adjacent pair of said second screens and being connected to said rear face of said housing of one of said second screens of the respective adjacent pair, each of said sliding mechanisms including two slide rails that are spaced apart from each other, and a slide frame connected slidably to said slide rails and coupled to a respective one of said second display panels, one of said slide rails having a first positioning recess, and a second positioning recess spaced apart from said first positioning recess, said slide frame having a plurality of rollers connected slidably to each of said slide rails, and a retaining unit, said slide frame being capable of bringing the respective one of said second display panels to move between an initial position where the respective one of said second display panels is located on said rear face of said housing of the respective one of said first and second screens and said retaining unit is retained in said first positioning recess, and an open position where the respective one of said second display panels is exposed from one side of said housing of the respective one of said first and second screens and said retaining unit is retained in said second positioning recess.

16. The electronic device of claim 15, wherein each of said slide rails extends transversely, said slide frame being capable of bringing the respective one of said second display panels to slidably move from the initial position to the open position along a transverse direction.

17. The electronic device of claim 16, wherein one of said slide rails of each of said slide mechanisms is proximate to a bottom end of said housing of the respective one of said first and second screens, and the other of said slide rails of each of said slide mechanisms is proximate to a top end of said housing of the respective one of said first and second screens, said slide frame further having a pin disposed proximate to a bottom end thereof, said retaining unit including a movable rod, and a wheel connected pivotally to said movable rod and to be retained in a selected one of said first and second positioning recesses, said movable rod having an elongated guide hole for extension of said pin therethrough, said elongated guide hole including a first end distal from said wheel and a second end proximate to said wheel, said pin being located at said first end when said wheel is retained in the selected one of said first and second positioning recesses.

18. The electronic device of claim 17, wherein said one of said slide rails of each of said slide mechanisms that is proximate to said bottom end of said housing of the respective one of said first and second screens has said first and second positioning recesses, said wheel being located intermediate of said rollers connected slidably to said one of said slide rails of each of said slide mechanisms that is proximate to said bottom end of said housing of the respective one of said first and second screens, said retaining unit further including a restoring spring that constantly biases said movable rod such that said pin is located at said first end.

19. The electronic device of claim 18, wherein one of said slide rails of each of said slide mechanisms further has a stop member for abutment by said slide frame of the respective one of said slide mechanisms at the open position, and each of said slide rails has a base wall for contacting by corresponding ones of said rollers, and two sidewalls extending respectively from two opposite sides of said base wall in a same direction, said slide frame of each of said slide mechanisms further having a plurality of limiting studs that are connected slidably and respectively to said slide rails of the respective one of said slide mechanisms, each of said limiting studs abutting against said two sidewalls of the respective one of said slide rails.

20. The electronic device of claim 19, wherein each of said first and second screens further includes four threaded posts projecting from said rear face of said housing thereof, and four screws, each of said slide rails being engaged with two corresponding ones of said threaded posts and having two through holes located at two opposite ends thereof, each of said screws extending through a respective one of said through holes and engaging a respective one of said threaded posts, a clearance being present between each of said screws and the respective one of said through holes.

* * * * *